UNITED STATES PATENT OFFICE.

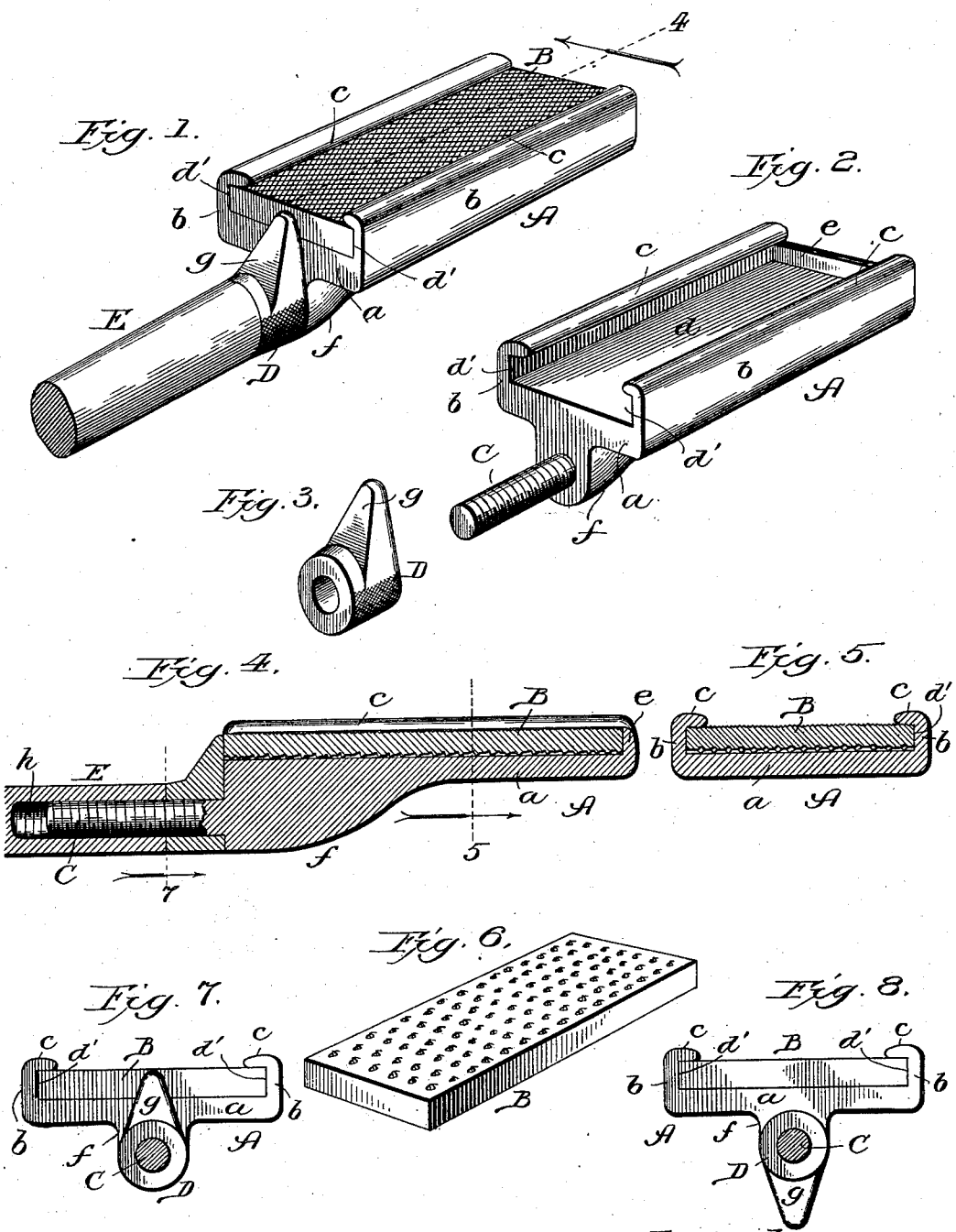

CHARLES E. CLARE, OF GLENELLYN, ILLINOIS.

VETERINARY FLOAT.

SPECIFICATION forming part of Letters Patent No. 687,494, dated November 26, 1901.

Application filed December 8, 1900. Serial No. 39,210. (No model.)

*To all whom it may concern:*

Be it known that I, CHARLES E. CLARE, a citizen of the United States, residing at Glenellyn, in the county of Dupage and State of Illinois, have invented a new and useful Improvement in Veterinary Floats, of which the following is a specification.

My invention relates to an improvement in the veterinary instrument known technically as a "float," a term signifying a rasping and filing instrument for smoothing the teeth of horses in particular.

My purpose is to overcome the objections in prior float constructions due to rusting of the screws or hinge mechanism employed in them for fastening the plate in its holder, and this I accomplish by employing instead of such screws and hinge mechanism the handle of the instrument, either directly or indirectly, for removably confining the plate in place in a manner to enable it to be readily removed from and readjusted in its holder and without material, if any, impairment of the securing means from the effect of the water in which the instrument has to be immersed to remove from it the fine filings which adhere to it from the animal's teeth operated upon.

In the accompanying drawings, Figure 1 is a broken perspective view of my improved device, displaying the file-surface of the float-plate; Fig. 2, a perspective view of the float-plate holder; Fig. 3, a similar view of the washer; Fig. 4, a section taken at the line 4 on Fig. 1 and viewed in the direction of the arrow; Fig. 5, a section taken at the line 5 on Fig. 4 and viewed in the direction of the arrow; Fig. 6, a perspective view of the float-plate, showing its rasp-surface; Fig. 7, a section taken at the line 7 on Fig. 4 and viewed in the direction of the arrow; and Fig. 8, a view like that presented by Fig. 7, but showing the plate-confining collar or washer in the position to which it is turned for releasing the plate to enable it to be withdrawn from the holder.

A is the metal plate-holder of a general rectangular form, comprising a flat base $a$, provided with sides $b\ b$, extending at right angles to it and turned inward at their upper edges, as shown at $c\ c$, to form a socket $d$ with parallel grooves $d'$ at its opposite sides, between which the float-plate B, hereinafter described, fits in the socket. At the forward end of the holder is formed for the float-plate an abutment-flange $e$, which should be rounded, as shown, on its outer surface to avoid injury to the mouth of the animal in operating upon its teeth. The back of the holder A terminates at its rear end in a boss $f$, having projecting from it a threaded stem C for rotatably supporting a collar or washer D, the body of which is of a diameter that maintains it below the plane of the open rear end of the holder-socket $d$; but it is provided with a laterally-extending enlargement, shown as a tooth $g$ of sufficient length to adapt it, when the washer is suitably turned on the stem for the purpose, to project across the open end of the socket $d$ for a purpose hereinafter described.

E is the handle, containing in its forward end an internally-threaded socket $h$ for screwing it on the stem C.

The float-plate B usually has file-teeth on one surface, as represented in Fig. 1, and rasp-teeth on the opposite surface, as represented in Fig. 6, and it fits in the socket $d$ of the holder A. The plate is locked in place by the tooth $g$ on the washer D projecting across its rear end, as shown in Fig. 1, the washer being firmly held in its locking position by the abutment against it of the handle when tightly screwed upon the stem C. To withdraw the plate B for any purpose from its holder, as for readjusting it therein in reverse position, the handle is unscrewed on the stem sufficiently to free the washer and permit it to be turned far enough to bring its tooth out of the path of the plate, which may then be readily withdrawn through the open rear end of the holder D, since, as will be observed, the handle and washer then present no obstruction to its withdrawal, being below or beyond the plane of the base of the socket in the holder, and the plate may be reinserted for adjustment the same way through the open end of the holder until stopped by the abutment $e$, when it is locked in place by turning the washer to extend its tooth across the rear end of the plate and tightly screwing the handle against the washer.

While the construction thus shown and described of my improved veterinary float is preferred as being the best known to me for accomplishing my aforesaid object, it may be modified in matters of detail without departure from my invention.

As will be seen, with my improved construction no such impairment of the utility of the device ensues from soaking it in water as that which is caused by the rusting effect of the water upon the screws and hinge mechanism of the prior devices referred to, because the locking means I provide besides being more convenient of manipulation are of a coarser character, adapting them to be much more readily handled and more effectively to overcome the effect of any rusting.

To overcome any resistance due to rusting of my locking means, the full strength of the hand-grip of the user may be exerted to the best advantage by turning the handle, while in the prior constructions comparatively small screws are rusted in and are much more difficult, besides being much less convenient of removal, because they can only be manipulated through the medium of a suitable screw-driver.

What I claim as new, and desire to secure by Letters Patent, is—

1. In a veterinary float, the combination of a holder open at its rear end and provided at said end with a threaded stem, a float-plate removably confined in said holder, a handle having an internally-threaded socket to receive said stem, and a washer rotatably supported on said stem and releasably confined thereon against retractions from the rear end of said plate by abutment of the handle against the washer.

2. In a veterinary float, the combination of a holder open at its rear end and provided at said end with a threaded stem, a float-plate removably confined in said holder, a handle having an internally-threaded socket to receive said stem, and a washer rotatably supported on said stem and releasably confined thereon against retractions from the rear end of said plate, said washer having a laterally-extended portion and being adapted to be turned, when released, to bring said portion beyond the path of said plate to free it for withdrawal.

CHARLES E. CLARE.

In presence of—
   A. C. KITTLESON,
   ALBERT D. BACCI.